(No Model.) 2 Sheets—Sheet 1.

B. F. SHULL.
COMBINED VELOCIPEDE, BABY WALKER, AND COACH.

No. 541,887. Patented July 2, 1895.

Witnesses
E. K. Stewart

Inventor
Benjamin F. Shull
By his Attorneys,
C. A. Snow & Co.

(No Model.) 2 Sheets—Sheet 2.
B. F. SHULL.
COMBINED VELOCIPEDE, BABY WALKER, AND COACH.
No. 541,887. Patented July 2, 1895.
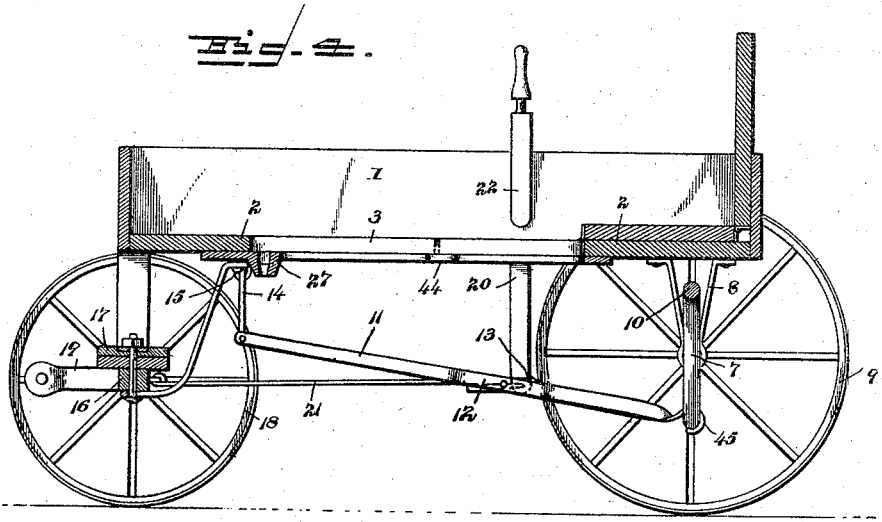
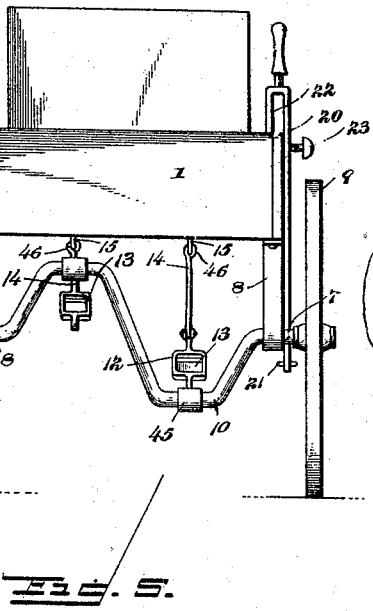
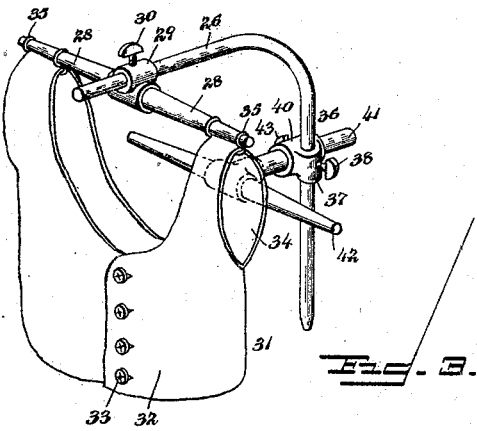
Witnesses
Inventor
Benjamin F. Shull
By his Attorneys,

UNITED STATES PATENT OFFICE.

BENJAMIN F. SHULL, OF OSNABURG, OHIO.

COMBINED VELOCIPEDE, BABY-WALKER, AND COACH.

SPECIFICATION forming part of Letters Patent No. 541,887, dated July 2, 1895.

Application filed October 22, 1894. Serial No. 526,643. (No model.)

*To all whom it may concern:*

Be it known that I, BENJAMIN F. SHULL, a citizen of the United States, residing at Osnaburg, in the county of Stark and State of Ohio, have invented a new and useful Combined Velocipede, Baby-Walker, and Coach, of which the following is a specification.

My invention relates to a convertible device adapted for use, either as a velocipede, a baby walker or tender, or child's wagon, and the object in view is to provide a simple device having parts which are capable of adjustment to suit the various uses named including improved means for supporting a child.

Further objects and advantages of the invention will appear in the following description and the novel features thereof will be particularly pointed out in the appended claims.

Figure 1:
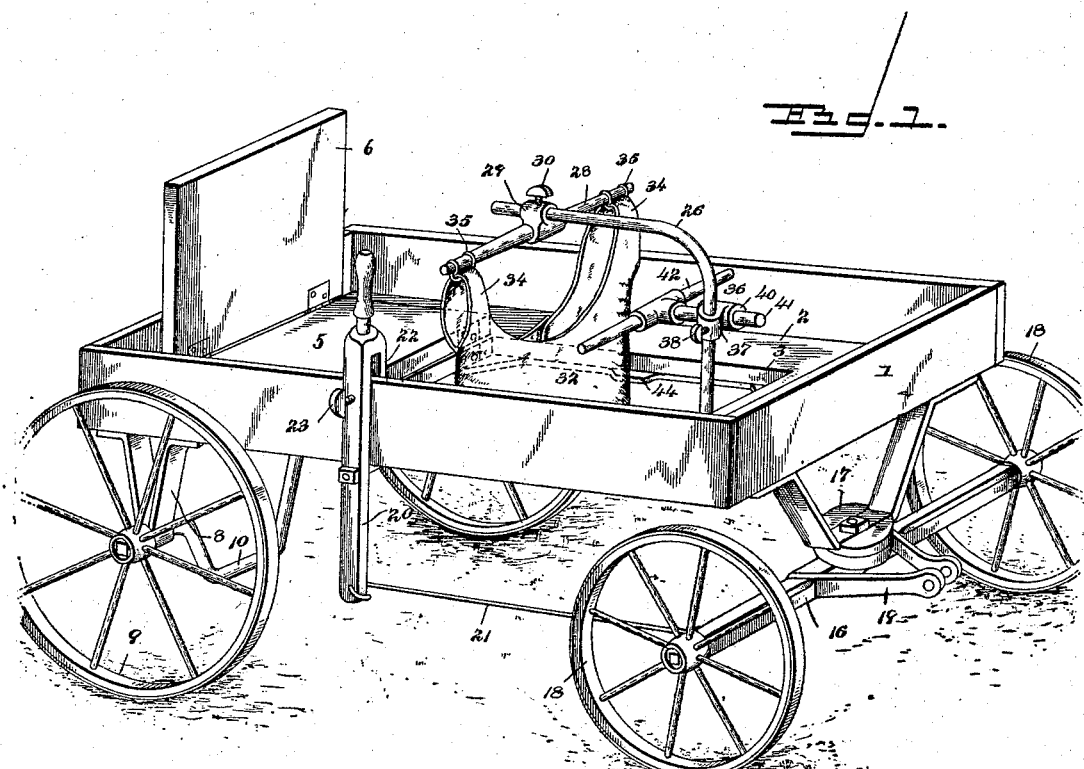
Figure 2:
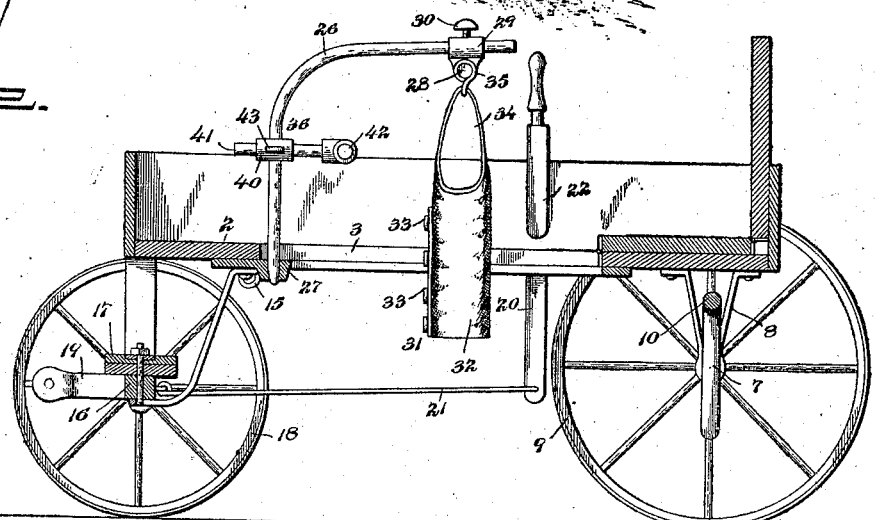

In the drawings, Figure 1 is a perspective view of a vehicle constructed in accordance with my invention, arranged for use as a baby walker or tender. Fig. 2 is a longitudinal section of the same. Fig. 3 is a detail view of the jacket and supporting spring. Fig. 4 is a longitudinal section showing the apparatus adapted for use as a velocipede. Fig. 5 is a rear view of the same.

Similar numerals of reference indicate corresponding parts in all the figures of the drawings.

1, designates the body portion of the vehicle, having a floor 2, which is cut away to form an opening 3. Hinged to the floor at one end of said opening therein is one end of a pair of connected leaves 4, comprising the rear leaf 5, and the front leaf 6, hinged together at their adjacent extremities. The length of the leaf 5, as shown may be equal to the distance between the rear end of the opening 3, and the rear upright side of the vehicle body, whereby, when the leaf is folded to occupy the position shown in Fig. 1, said leaf 5, rests upon the upper surface of the main body of the floor, and the terminal leaf 6, stands in an upright position to form the back of a seat. The parts are arranged in this position to form a seat for a rider when the apparatus is employed as a velocipede, but the proportions may be varied.

The driving axle 7, is mounted in bearings 8, near the rear end of the body of the vehicle and on the extremities thereof are fitted the ground wheels 9, the intermediate portion of the axle being provided with the oppositely extending cranks 10, to which are connected the rear ends of the pedal beams 11. These beams are provided at intermediate points with loops 12, in which are fulcrumed the pedals or foot rests 13. The front ends of the pedal beams are suspended by means of links or hangers 14, connected at their upper extremities to eyes 15, on the under side of the floor of the vehicle body. The front or steering axle 16, is pivotally mounted by means of a turn-table 17, and mounted upon the extremities thereof are the steering wheels 18, carrying hounds 19, for attachment to a tongue. Not shown.

Fulcrumed at an intermediate point to the side of the vehicle body is a steering lever 20, connected at its lower end by means of a link 21 to an eye on the front axle, and provided at its upper end with a guiding arm 22, which bears against the inner surface of the side of the vehicle body. A set screw 23, is carried by said lever to engage the side of the vehicle body and thereby lock the steering axle in a given position to cause the vehicle to travel in a circle, when the device is in use as a baby walker.

The means for supporting a child in the vehicle, consist of a supporting spring 26, stepped at its lower end in a seat or socket 27, arranged near the front end of the opening in the floor of the body, and having a rearwardly extending arm to which is connected a cross bar 28. The cross bar is provided at its center with a sleeve 29, to receive the horizontal portion of the supporting spring, and a set screw 30, is provided to secure the cross bar at the desired adjustment. The jacket or garment in which the child is placed is shown at 31, and it comprises a trunk-portion 32, provided with suitable fastening devices such as buttons 33, and arm-portions 34, which are secured by means of eyes 35, to the extremities of the cross-bar. Secured to the vertical portion of the spring or standard is a clamp 36, having a sleeve 37, for the reception of said standard, and a set screw 38, whereby the clamp may be locked at the desired adjustment. The clamp is further provided with a horizontal sleeve 40, in which is fitted the stem 41, of a handle bar 42, a set screw 43, being provided to secure said stem at the desired adjustment.

It will be seen from the above description, that the spring standard which forms the means for supporting a child in the opening of the body portion may be detached, when it is desired to use the apparatus either as a velocipede or as a child's wagon, and bearing lugs 44, are arranged with their upper sides flush with the lower surface of the floor of the body of the vehicle to support the foldable leaves when said leaves are in their horizontal position, in which they close the opening in said floor of the body.

When the device is in use as a baby walker, the pedal beams must be detached, and in order to provide for such detachment, the rear ends of the beams have the bearings 45, which engage the bearing portions of the cranks of the axle, and the upper ends of the links or hangers by which the front ends of the pedal beams are supported, terminate in hooks 46, which engage said eyes upon the under side of the floor of the vehicle body.

When the operating mechanism and the baby supporting devices are removed, the leaves may be extended to close the opening in the floor of the body and thus adapt the vehicle for use as an ordinary wagon.

Various changes in the form, proportion and the minor details of construction may be resorted to without departing from the principle or sacrificing any of the advantages of this invention. Among such changes may be noted the specific construction of the boards or leaves which close the opening in the floor of the vehicle, which may be made of any preferred size; the bearings whereby connection is made with the crank axle, and similar details.

One of the ground-wheels is fixed to the crank shaft and the other is loosely mounted thereon. The object of this construction is to provide for setting the steering wheels at an angle to cause the vehicle to describe a circle when in use as a baby walker, and avoid the slipping or sliding of the rear or driving wheels, which would be caused by the outer wheel traveling through a circle of greater diameter than the inner wheel.

Having thus described the invention, what is claimed, and desired to be secured by Letters Patent, is—

1. In a vehicle, the combination with a body having an opening, and wheels for supporting said body, of a spring standard secured to the body and having an approximately horizontal portion, a cross bar adjustably secured to the said approximately horizontal portion of the standard, and a jacket or garment suspended from said cross bar, substantially as specified.

2. In a vehicle, the combination with a body and supporting wheels, of a spring standard removably stepped in a socket in the body and having an approximately horizontal upper portion, a jacket suspended from a cross bar attached to the extremity of said standard, and a handle bar secured to the standard and arranged in front of said jacket, substantially as specified.

3. In a vehicle, the combination with a body and supporting wheels, of a spring standard having the rearwardly extending approximately horizontal portion, a cross bar adjustably secured to the approximately horizontal portion of the standard, a jacket suspended from said cross bar, a clamp mounted upon a vertical portion of the standard, means for locking the clamp at the desired vertical adjustment, a handle bar having a stem adjustably fitted in a horizontal sleeve forming a part of said clamp, and means for locking said stem to hold the handle bar at the desired adjustment, substantially as set forth.

In testimony that I claim the foregoing as my own I have hereto affixed my signature in the presence of two witnesses.

BENJAMIN F. SHULL.

Witnesses:
G. W. NIMON,
W. O. WENTZ.